Dec. 16, 1947.  G. J. KLEIN  2,432,625
APPARATUS FOR AND METHOD OF LOCATING SUBMARINES
Filed July 10, 1943  2 Sheets-Sheet 1
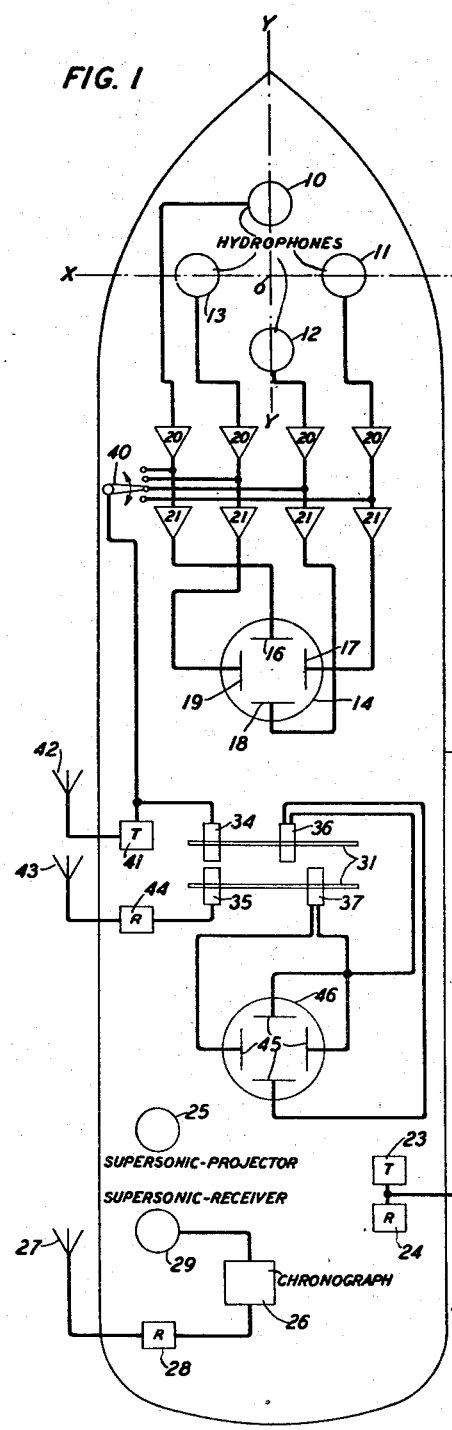
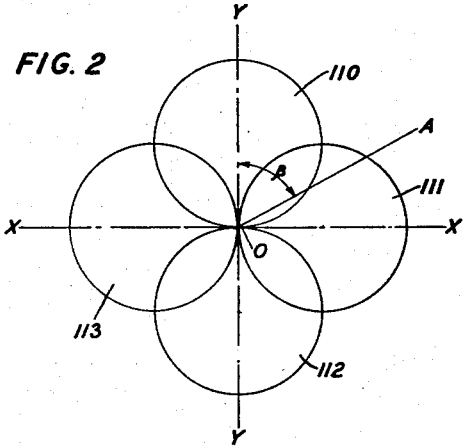
INVENTOR
G. J. KLEIN
BY
Walter C. Kiesel
ATTORNEY Dec. 16, 1947.  G. J. KLEIN  2,432,625
APPARATUS FOR AND METHOD OF LOCATING SUBMARINES
Filed July 10, 1943  2 Sheets-Sheet 2

INVENTOR
G. J. KLEIN
BY
Walter C. Kiesel
ATTORNEY

Patented Dec. 16, 1947

2,432,625

UNITED STATES PATENT OFFICE 2,432,625

APPARATUS FOR AND METHOD OF LOCATING SUBMARINES

George J. Klein, New York, N. Y., now by change of name George J. Kent, assignor to Western Electric Company, Incorporated, New York, N. Y., a corporation of New York Application July 10, 1943, Serial No. 494,185

4 Claims. (Cl. 177—386)

This invention relates to apparatus for and methods of locating submarines and, more particularly, to apparatus for and methods of determining the position of a submarine with respect to one or more ships, for example escort vessels in a convoy, in accordance with information derived from signals emanating from the submarine and detected at two or more of the ships.

One object of this invention is to enable the accurate location of a submarine in accordance with information derived from signals originating at the submarine.

Another object of this invention is to enable discrimination between the signals emanating from two or more submarines in a group and detected at two or more ships so that the position of each submarine may be determined in accordance with the signals originating thereat and detected at the ships, whereby incorrect determination of a submarine's location due to false information contained in signals emanating from other submarines in the vicinity thereof is prevented.

A further object of this invention is to facilitate the determination of the difference in distance between a submarine and two ships so that from this distance difference and other readily obtainable information the submarine's position can be located accurately.

In one submarine locating system illustrative of this invention, each of two or more ships, for example escort vessels in a convoy, is provided with compressional wave signal detectors, such as a group of hydrophones, the response or output of which is indicative of the direction of the signal source, i. e., submarine, with respect thereto, means, such as a cathode ray oscillograph, for resolving the detector outputs into indicia of the direction of the submarine's position, means for communicating with the other ship or ships, and apparatus for determining accurately the distance between each two ships. The submarine signals detected at each two ships provide information as to the direction of the submarine's position with respect to these ships and from this information and the determined distance between the ships and the angle between the courses thereof and the line interconnecting the ships, the submarine's position is readily determined geometrically.

In accordance with one feature of this invention, one or more of the ships are provided with apparatus for comparing the signals detected at two or more ships whereby it can be determined whether or not the signals detected at two or more ships emanated from the same submarine. In one specific form, this apparatus comprises a double or multiple magnetic tape or wire recorder, the tapes of which are driven at the same lineal speed, each tape having a recorder head and a reproducer head cooperatively associated therewith. Each recorder head is energized in accordance with signals detected at a corresponding ship and the reproducer heads are connected to pairs of deflector plates of a cathode ray oscillograph. The reproducer heads are movable along the respective tapes and, when the corresponding recorder heads are energized, are moved until the trace produced upon the screen of the oscillograph associated therewith is substantially rectilinear. Such a rectilinear trace is obtained only when the signals in accordance with which the recorder heads are energized are of the same form, i. e. correspond to sounds emanating from the same submarine.

In accordance with another feature of this invention, the position of the submarine is determined from the information as to the distance between ships, the direction of the ship's location with respect to one another, the direction of the submarine's location with respect to one ship and the distance between the reproducer heads requisite to produce a substantially rectilinear trace upon the screen of the cathode ray oscillograph associated therewith. Specifically, in one method the intersection of the line indicative of the direction of the submarine's position with respect to one ship, and the locus of points satisfying the difference in distance of the submarine from two ships, which difference is measured by the spacing of the reproducer heads, is obtained graphically, this intersection corresponding to the location of the submarine.

The invention and the above-noted and other features thereof will be understood more clearly and fully from the following detailed description with reference to the accompanying drawing, in which:

Fig. 1 is a diagrammatic view illustrating the general organization of the apparatus included in a submarine locating system illustrative of one embodiment of this invention;

Fig. 2 is a diagram showing the form and spatial relation in the horizontal plane of the directional patterns of the group of hydrophones included in the submarine locating system illustrated in Fig. 1;

Figure 3:
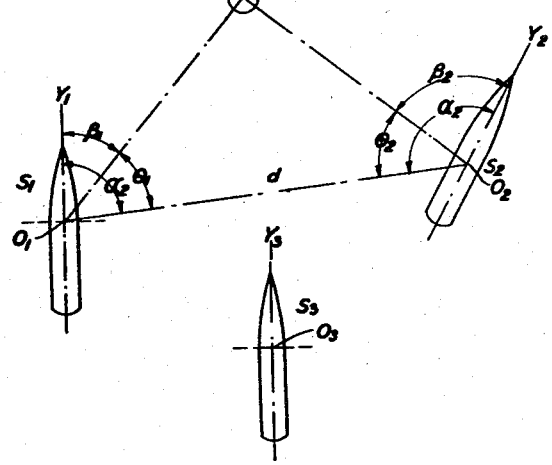
Fig. 3 is another diagram showing a typical arrangement of convoying ships utilizing systems in accordance with this invention for locating a submarine in the vicinity of the convoy.

In general, determination of the location of a submarine in accordance with this invention entails the detection of signals emanating from the submarine, at two or more ships and the correlation of information derived from the detected signals in manners described hereinafter to determine the position of the submarine with respect to the ships. The ships may be positioned, for example about an area embracing a group of convoyed ships, in the general relation illustrated in Fig. 3 wherein three convoying ships are indicated at $S_1$, $S_2$ and $S_3$, the ships' courses being in the direction of their longitudinal axes $Y_1$, $Y_2$ and $Y_3$, respectively. The submarine to be located is indicated at A.

Each ship S, as illustrated in Fig. 1, has mounted thereon, for example below the keel and adjacent the bow thereof, a group of hydrophones 10, 11, 12 and 13, the several hydrophones being substantially identical and having their pick-up patterns in quadrature. For example, as illustrated in Fig. 2, the hydrophones 10, 11, 12 and 13 may have substantially circular or spherical field characteristics 110, 111, 112 and 113, respectively, orthogonally related spatially about a common axis or center O. It will be understood that the hydrophones may be positioned in the manner illustrated in Fig. 1 without substantial departure of the field characteristics from the relation shown in Fig. 2 provided that the hydrophones are spaced from one another distances small in comparison to the wavelengths corresponding to the signals to be detected. Alternatively, the several hydrophones may be arrayed in vertical alignment, advantageously so when they are intended for reception of supersonic signals.

Associated with the hydrophones is a cathode ray oscillograph 14 having deflector plates 16, 17, 18 and 19 conveniently arranged in the same relation as the hydrophones. The output voltage of each hydrophone is impressed upon a corresponding one of the deflector plates by way of an amplifier 20 and associated rectifier 21.

Because of the spherical or circular directional pattern of the hydrophones, the output of each hydrophone will be a function of the angle of incidence of the compressional wave signals thereon. For example, if the submarine is located along the line OA in Fig. 2 with respect to the common axes of the hydrophones, the output of the hydrophone 10 will be proportional to cosine $\beta$, $\beta$ being the angle between the line OA and the axis Y, it being assumed that the field patterns of the hydrophones are positioned with respect to the Y axis in the relation shown in Figs. 1 and 2. Similarly, in the example under consideration, the output of the hydrophone 11 will be proportional to sine $\beta$. The outputs of the hydrophones 10 and 11 as applied, after amplification and rectification, to the respective deflector plates 16 and 17 will cause deflection of the electron beam along a line angularly related to the coordinate axes of the deflector plates in the same relation as the line OA to the coordinate axes X and Y of the directional patterns of the hydrophones and the trace produced upon the fluorescent screen of the cathode ray oscillograph 14 will be an indicia of the bearing of the submarine with respect to the ship. Thus, the direction of the submarine with respect to the position or course of each convoying ship is determined.

Each convoying ship is provided with suitable means, such as an antenna 22 and associated transmitter 23 and receiver 24, for communicating with the other convoying ship or ships and is provided also with a supersonic submarine signal projector 25. Also mounted upon each ship is a chronograph 26 which is set into operation by signals received by way of an antenna 27 and associated receiver 28 and is stopped by supersonic submarine signals received by supersonic receiving equipment 29.

Each convoying ship transmits periodically and simultaneously supersonic and radio signals, as by the projector 25 and transmitter 23, respectively. The radio signal from any one ship as received at the antenna 27 of a second ship initiates operation of the chronograph 26 at the second ship and the corresponding supersonic signal projected by one ship and received at the supersonic receiver 29 of the second ship results in stoppage of the chronograph. The time interval between the starting and stopping of the chronograph is, of course, a measure of the distance between the first and second ships. Each signal enables the determination of the direction of the transmitting ship's position with respect to the course of a second ship.

As noted heretofore, the bearing of the submarine A with respect to each convoying ship is indicated by the oscillograph 14 at the respective ship. Thus, referring to Fig. 3, the angles $\beta_1$ and $\beta_2$ for example, are known. Angles $\alpha$ may be found by any convenient method used for radio or supersonic direction finding. Each ship, of course, communicates its respective angles $\beta$ and $\alpha$ to the other ship or ships. The length $d$ of the line $O_1O_2$ is readily calculable from the time interval determined by the chronograph as described above, and the known velocity of the supersonic signals in sea water. Hence, all the information requisite for solution of the triangle $O_1O_2A$ is obtained and the bearing and distance of the submarine A with respect to each of the convoying ships are determined.

Although the procedure for locating a submarine has been described hereinabove with particular reference to two ships, such as $S_1$ and $S_2$ in Fig. 3, it will be understood that the same procedure may be employed utilizing similar systems of the organization described upon three or more convoying ships. The location of the submarine from information obtained at each two ships affords a check of the location of the submarine from information obtained at any other pair of ships. Further, location by three or more convoying ships provides a reserve in the event of disablement of one ship, or of more than one ship if more than three convoying ships are involved.

Figure 4:
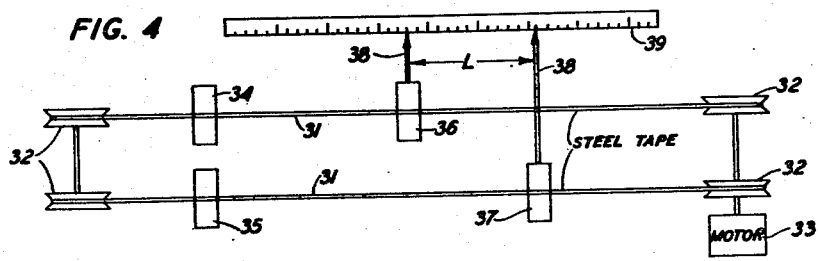
Fig. 4 is a diagrammatic view of a multiple magnetic tape recorder embodied in the apparatus illustrated in Fig. 1.

As is known, submarines frequently travel in packs or groups and there is a possibility, therefore, that the information derived at one convoying ship from the outputs of the hydrophones thereat may be with respect to one submarine of the group, whereas the information obtained similarly at another convoying ship may be with respect to a different submarine of the group. In accordance with one feature of this invention, means are provided for assuring that the indication of a submarine's bearing at the several convoying ships is in accordance with sounds emanating from the same submarine. As shown in Fig. 1, each ship has mounted thereon a double or multiple tape recorder comprising, for example, as shown more clearly in Fig. 4, a pair of similar, continuous steel tapes or wires 31 wound over spools or pulleys 32 and driven at the same rate by a motor 33. Each tape has associated therewith a fixed recorder head 34 or 35 and a reproducer head 36 or 37 movable along the respective tape. The reproducer heads are provided with pointers 38 the distance between which may be measured on a suitable scale 39. One of the recorder heads, for example the head 34 in Fig. 1, is coupled to a suitable switch 40 so that it may be connected selectively to any one of the amplifiers 20, advantageously the amplifier associated with the hydrophone having the greatest output at any particular time. The amplifiers 20 also may be connected selectively by way of the switch 40, to a radio transmitter 41 and thence to an antenna 42. The other recorder head, for example the head 35 in Fig. 1, is connected to an antenna 43 by way of a receiver 44. The output voltages obtained from the reproducer heads 36 and 37 are impressed between the respective pair of deflector plates 45 of a cathode ray oscillograph 46.

A signal corresponding to the output of one of the hydrophones 10, 11, 12 or 13 in each ship, advantageously the hydrophone having the greatest output at any particular time, is transmitted over the antenna 42 and, as received at the antenna 43 at a second ship, is impressed upon the recorder head 35 at the second ship. The reproducer heads 36 and 37 are then moved along the respective tape 31 until the trace appearing upon the screen of the cathode ray oscillograph 46 is approximately a straight line. A straight line trace will be obtained, of course, only when the signals applied to the recorder heads 34 and 35 are of identical form, so that the straight line trace is obtained only when the hydrophones on the two ships are detecting sounds emanating from the same submarine.

The distance L between the reproducer heads 36 and 37 when in the positions resulting in the rectilinear trace on the screen of the oscillograph 46 is a measure of the time difference between the submarine signals arriving at the two ships so that the difference in the distances of the submarine from the two ships can be determined. Specifically, the time difference $t$ is equal to the quotient of the distance L by the linear speed of movement, $v$, of the tapes 31. The velocity, $c$, of sound in water is, of course, known. The difference in distances noted above, designated as $2a$ is then determinable from the relation $$2a = t \times c = \left(\frac{c}{v}\right)L$$

Figure 5:
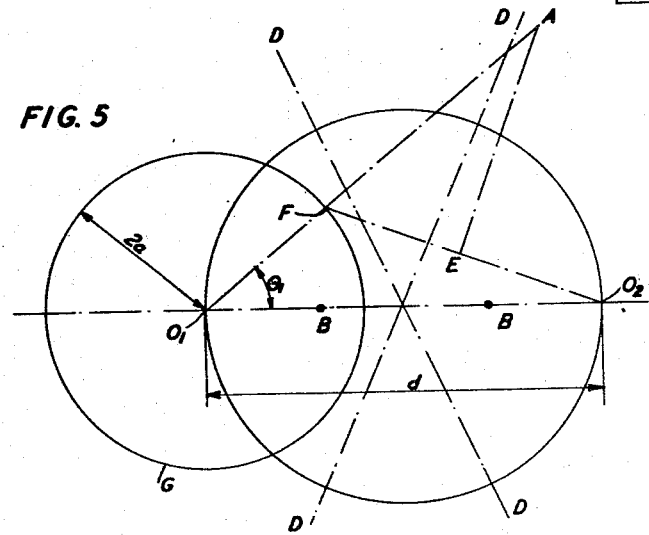
Fig. 5 is a plot illustrating one method of determining the location of a submarine from information obtained from apparatus in the organization shown in Fig. 1.

From this difference in distances, the distance between two ships, the direction of the ships with respect to one another and the direction of the submarine's position with respect to one ship, the distance and direction being determined, for example, in the manners described hereinabove, the location of the submarine can be obtained graphically as illustrated in Fig. 5.

The locus of points satisfying the distance difference $2a$ is a hyperbola having its foci at $O_1$ and $O_2$, i. e. at the two ships, and its transverse axis B—B equal to $2a$. The asymptotes of the hyperbola are shown at D—D. As noted above, the distance $d$ between $O_1$ and $O_2$ and the angle $\theta_1$ between $O_1A$ and $O_1O_2$ are known. The position of the submarine, then, will be the point of intersection of the line $O_1A$ and the hyperbola. This point is the intersection of the line $O_1A$ and the perpendicular bisector AE of the line $FO_2$, the point F being the intersection of the line $O_1A$ and the circle G having a radius $2a$.

Inasmuch as the distance $2a$ is obtained from information based upon the detection of sounds from the same submarine, it will be appreciated that the position of each submarine in a group can be located.

As has been pointed out hereinabove multiple tape or wire recorders, i. e. recorders having more than two tapes all driven at the same speed may be employed. For example, if a three-tape recorder is utilized, the difference in distances of the submarine from each two of three ships can be determined in the same manner as described above with respect to Fig. 4. From the distances between ships, their angular relation, and the difference distances, three hyperbolae can be drawn, each being the locus of points satisfying the difference distance for two ships. The position of the submarine will correspond to the intersection of the three hyperbolae, as will be apparent. Alternatively, the position of the submarine can be obtained from the information obtained in the manner described, by use of known devices such, for example, as a Drysdale instrument.

Although specific embodiments of the invention have been shown and described, it will be understood that they are but illustrative and that various modifications may be made therein without departing from the scope and spirit of this invention as defined in the appended claims.

What is claimed is:

1. The method of locating an object with respect to a pair of stations which comprises determining the position of said stations with respect to each other, detecting at both of said stations signals emanating from the object, resolving the signals detected at one of said stations into an indicia of the direction of said object with respect to said one station, converting the signals detected at both of said stations into a measurement of the difference in distances between said object and the two stations, and determining the intersection of the locus of points for said difference in distances and said indicia of direction.

2. The method of locating a submarine with respect to a pair of ships which comprises determining the distance between said ships and the direction thereof with respect to each other, detecting at both of said ships signals emanating from the submarine, resolving the signals detected at one of said ships into an indicia of the direction of said submarine with respect to said one ship, converting the signals detected at both of said ships into a measure of the difference in distances between said submarine and said ships, plotting the locus, with respect to a line connecting said ships, of points for said difference in distances, and determining the intersection of a line indicative of said direction and said locus.

3. The method of locating a submarine with respect to a pair of ships which comprises determining the distance between said ships and the direction thereof with respect to each other, detecting at both said ships signals in the vicinity thereof, resolving the signals detected at both of said ships into electrical signals, resolving the signals detected at one of said ships into indicia of the direction of the submarine's position with respect to said one ship, comparing the signals at both said ships to determine that the detected signals at both ships emanate from the submarine, resolving the signals corresponding to those emanating from said submarine into a measure of the difference in distances between said submarine and said ships, and determining the intersection of the locus of points satisfying said difference in distance and the line indicative of said direction.

4. A system for locating a submarine with respect to a pair of ships comprising a pair of signal detectors one on each of the ships, means on one of said ships for resolving the output of the detector thereon into an indication of the direction of the source of signals received thereby, means for establishing communication between said ships, whereby each ship may communicate its direction to the other, means on said one ship for determining the distance between said ships, a magnetic tape recorder on said one ship including a pair of magnetic tapes, a recorder head and a reproducer head cooperatively associated with each tape and means for driving said tapes, means for energizing each recorder head in accordance with signals received at a corresponding one of said detectors, and means for comparing the outputs of the reproducer heads to determine the difference in distances between the submarine and said ships.

GEORGE J. KLEIN.

REFERENCES CITED

The following references are of record in the file of this patent:

UNITED STATES PATENTS

| Number | Name | Date |
|---|---|---|
| 1,453,316 | Fessenden | May 1, 1923 |
| 1,225,796 | Fricke | May 15, 1917 |
| 2,296,032 | Hammond | Sept. 15, 1942 |
| 1,415,973 | Allen et al. | May 16, 1922 |
| 1,149,976 | Furber | Aug. 10, 1915 |
| 1,564,303 | Wold | Dec. 8, 1925 |

FOREIGN PATENTS

| Number | Country | Date |
|---|---|---|
| 473,067 | Great Britain | Oct. 6, 1937 |